United States Patent [19]
Cadiou

[11] 3,883,166
[45] May 13, 1975

[54] END STRUCTURES FOR VEHICLES
[75] Inventor: Jean Cadiou, Paris, France
[73] Assignee: Societe Anonyme Automobiles Citroen, Paris, France
[22] Filed: Nov. 20, 1973
[21] Appl. No.: 417,575

[30] Foreign Application Priority Data
Nov. 28, 1972 France.................................. 42251

[52] U.S. Cl..................... 293/63; 293/70; 296/28 R
[51] Int. Cl............................................ B60r 19/02
[58] Field of Search .......... 293/63, 1, 70, 71 R, 86, 293/95, DIG. 3; 188/1 C; 296/28 R

[56] References Cited
UNITED STATES PATENTS
| | | | |
|---|---|---|---|
| 3,511,345 | 5/1970 | Takanatsu et al. ............... | 293/70 X |
| 3,519,301 | 7/1970 | Somnitz.................................. | 293/1 |
| 3,738,696 | 1/1973 | McLauchlan......................... | 293/70 |

Primary Examiner—Lloyd L. King
Assistant Examiner—John J. Love
Attorney, Agent, or Firm—Stevens, Davis, Miller & Mosher

[57] ABSTRACT

The structure includes a transverse unit forming a wall of the body and at least one longitudinal member extending from the transverse unit to which it is fast up to the end of the vehicle. It includes a longitudinal auxiliary member forming an angle with the longitudinal member extending between the transverse unit and the end of the longitudinal member, said auxiliary member being fixed at one end to the longitudinal member (or to the transverse unit). The second end of the auxiliary member is free and separated by a gap from a stop zone provided on the transverse unit (or the longitudinal member). The structure is particularly useful for the front end of a vehicle with a transverse engine-drive assembly unit.

10 Claims, 5 Drawing Figures

END STRUCTURES FOR VEHICLES

The invention relates to a longitudinal end structure of a vehicle comprising a transverse unit forming a wall of the body and at least one longitudinal member extending from the transverse unit to which it is fast up to the end of the vehicle.

The invention relates more particularly, because it is in this case that its application seems to have the most advantage, but not exclusively, to a longitudinal end structure of a vehicle in which the general direction of the longitudinal member is inclined to the longitudinal axis of the vehicle, that is to say that in the horizontal or vertical projection or along the two projections, the direction of the longitudinal member is not parallel to the longitudinal axis of the vehicle.

A structure of the abovedefined type may be found at the front of a vehicle. This is the case especially in a vehicle comprising, on one hand, a rigid transverse caisson i.e. a hollow box element, forming a wall of the body and constituting the abovesaid transverse unit, supporting on each side the elements of the front axle and, on the other hand, one or several longitudinal members intended to support the front elements of the cab as well as the front bumpers; these longitudinal members extend from the caisson, either below, or above, joining an abutment or bumper support at the level of the front bumpers. This type of construction is particularly well adapted to vehicles of the "engine/front wheel drive" type; the one or more inclined longitudinal members, through their slope or through their curvature, leave a passage free for the transmission shafts between the engine and the wheels; moreover, the engine-drive assembly unit may be accommodated by the caisson and fixed on the front surface of the latter.

It is also possible to encounter a structure as previously defined at the rear of a vehicle, in an arrangement identical to that which has just been described, but placed symmetrically at the rear of the vehicle.

Such a rear structure is well adapted to vehicles called "engine/rear wheel drive".

It is a particular object of the invention, to render structures of the abovedefined type such that they respond to the various exigencies of practice better than hitherto and especially such that their energy absorbing capacities, in the case of a shock directed substantially along the longitudinal axis of the vehicle, by folding and deformation are improved.

According to the invention, a longitudinal end structure for a vehicle comprising a transverse unit forming a wall of the body and at least one longitudinal member extending from the transverse unit to which it is fast up to the end of the vehicle is characterised by the fact that it comprises a longitudinal auxiliary member, forming an angle with the longitudinal member and extending between the transverse unit and the end of the longitudinal member, one at least of the two elements constituted by the longitudinal member and said auxiliary member being inclined to the longitudinal direction of the vehicle, said auxiliary member being fixed at one end to the longitudinal member (or to the transverse unit), the second end of said auxiliary unit being free and separated by a gap from a stop zone provided on the transverse unit (or the longitudinal member), this second end being adapted to become supported against said stop zone only after deformation of the element or of one of the two elements inclined to the longitudinal direction of the vehicle.

Advantageously, when the auxiliary unit is fixed to the end of the longitudinal member and said stop zone is provided on the transverse unit the engine-drive assembly is arranged transversely and constitutes a part of said transverse unit, the abovesaid stop zone being constituted by a zone of high mechanical strength of the engine-drive assembly.

When the general direction of the longitudinal member is inclined to the longitudinal axis of the vehicle, at least along one of its horizontal or vertical projections, the auxiliary member is preferably rectilinear and parallel to the longitudinal axis of the vehicle.

The auxiliary member may be extended beyond the end of the longitudinal member.

The invention consists, apart from the features mentioned above, of certain other features which will be more explicitly considered below with regard to preferred embodiments described in detail with reference to the accompanying drawings, of which are in no way to be considered as limiting.

FIG. 1 of these drawings shows, diagrammatically, in elevation, one embodiment of a front end structure of a vehicle according to the invention.

Figure 3:
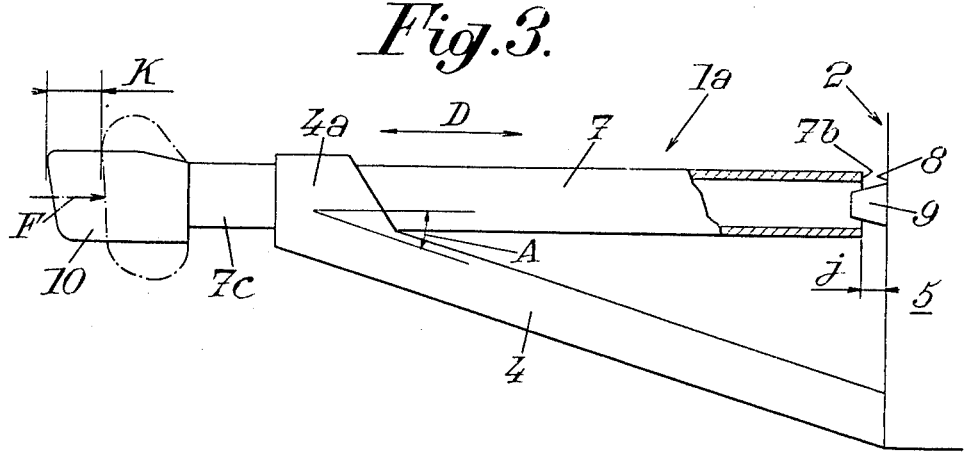
FIG. 3 shows, diagrammatically, in elevation, another embodiment of an end structure of a vehicle according to the invention.
Figure 4:
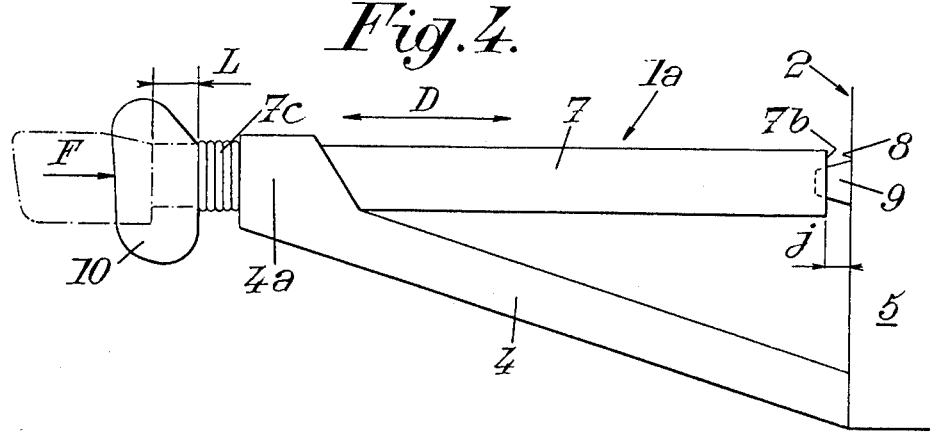
Figure 5:
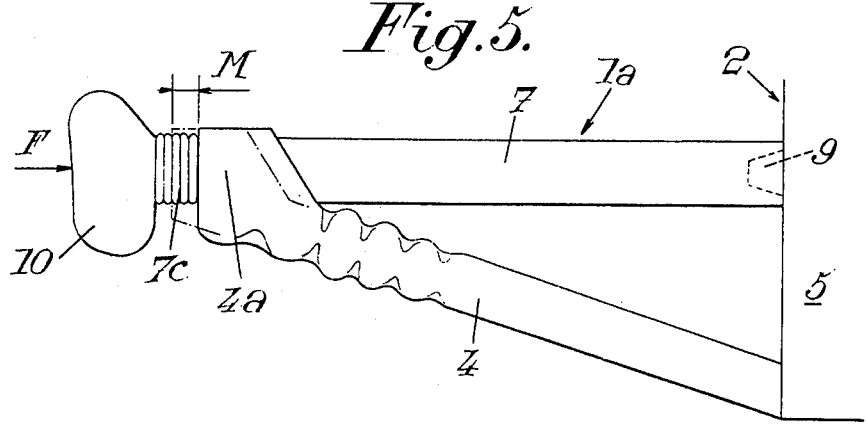

FIGS. 4 and 5, lastly, show the embodiment of FIG. 3, in different stages of its deformation as a result of a shock.

Figure 1:
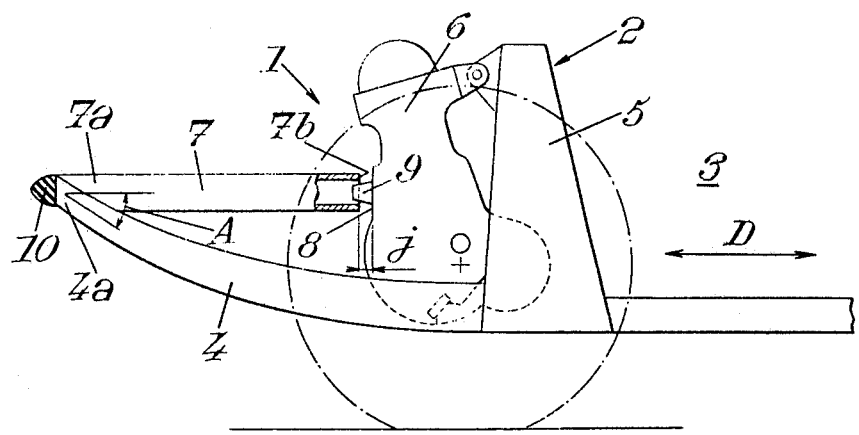

Referring to FIG. 1, there can be seen a longitudinal end structure 1 of a vehicle comprising a transverse unit 2 forming a wall of the body 3 and at least one first longitudinal member 4 extending from the transverse unit 2, to which it is fixed to the end of the vehicle. In the drawings, there is shown a front end structure of a vehicle, but this could be just as well a rear end structure. A vehicle wheel has been shown in mixed lines in FIGS. 1 and 2.

The transverse unit 2 is constituted by a caisson, or hollow box element, 5 sufficiently rigid so that in the case of longitudinal shock the longitudinal end of the vehicle can first be deformed before the caisson becomes driven in. Protection of the occupants of the body 3 is thus ensured.

The engine-drive assembly 6 is preferably arranged transversely and cooperates with the caisson 5 to constitute the rigid transverse unit 2. The unit 6 is fixed to the caisson 5.

A second, auxiliary, longitudinal member 7 extends between the transverse unit 2 and the front end 4a of the longitudinal member 4; the auxiliary member 7 forms an angle A with the average direction of the end 4a of the longitudinal member 4.

Figure 2:
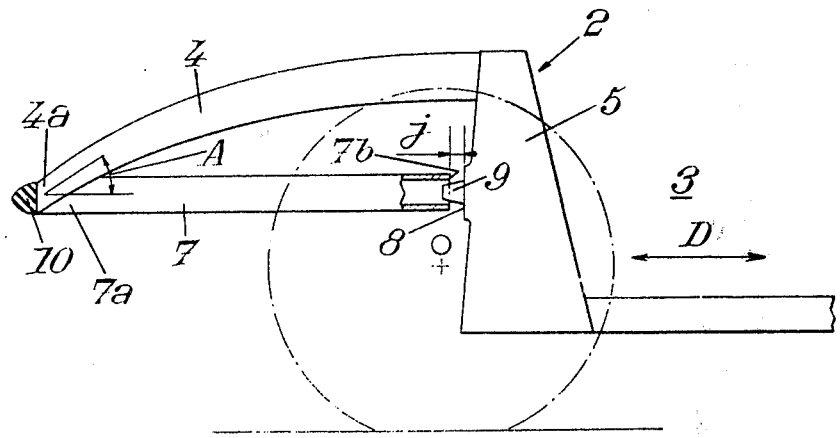
FIG. 2 shows, diagrammatically, in elevation, a modification of the embodiment of FIG. 1.

One at least of the two elements constituted by the longitudinal member 4 and the auxiliary member 7 is inclined to the longitudinal axis D of the vehicle. In the embodiments shown in the drawings, it is the longitudinal member 4 which is inclined to a said axis D, either in horizontal projection, or in vertical projection, or along both projections. Thus, the ends of this longitudinal member are not on a same longitudinal line of the vehicle. In FIGS. 1 and 2, the longitudinal member 4 has substantially the shape of a circular arc.

This longitudinal member 4 can start from the base of the caisson 5 and ascend towards the front as in FIG. 1 or start from the top of the caisson 5 to descend towards the front as shown in FIG. 2.

The auxiliary member 7 is fixed, towards one end 7a, on the longitudinal member, in the vicinity of the end 4a of said longitudinal member, the second end 7b of said auxiliary member being free and separated by a gap j from a stop zone 8 provided on the transverse unit. Advantageously, when the engine-drive assembly 6 is arranged transversely so as to form part of the transverse unit 2, the stop zone 8 is provided on a part of this engine-drive assembly 6 of strong mechanical strength (FIG. 1). The presence of the engine-drive assembly unit is interesting through the great rigidity which this unit has in the assembly of the transverse unit 2. It enables the substitution of the rigid mass of the unit 6 for reinforcements of the caisson 5 proper, which are made necessary at the level of the stop zone 8 by the considerable unit load which the support of the auxiliary member represents. This is the case in the embodiment of FIG. 2 where the stop zone 8 is provided on the caisson 5.

In a modification (not shown), the auxiliary member 7 could be fixed to the transverse unit 2, especially to the caisson 5, and the front end of said auxiliary member would be free and separated by a gap from a stop zone provided at the end 4a of the longitudinal member 4. The auxiliary member 7 may be in any known form of energy absorbing elements. It has been shown in the drawings by a simple rectilinear tubular element, parallel to the longitudinal axis D of the vehicle.

A guide means constituted by a finger 9 is provided on each stop zone 8 so as to be engaged in the tubular auxiliary member 7 in order to ensure the position of the surface of said auxiliary member directed towards the stop zone.

Generally, a longitudinal member 4 is provided on each side of the vehicle so that, an auxiliary member 7, associated with each longitudinal member, is also provided.

In the case of longitudinal shock against an end structure according to the invention, and such as shown in FIGS. 1 and 2, the longitudinal member 4 undergoes, firstly, only deformation and buckling so that the gap j is filled and the auxiliary member 7 becomes supported against the stop zone 8. If the shock is sufficiently great for all the energy to be unabsorbed by the initial deformation of the longitudinal member 4, the auxiliary member 7 then becomes deformed with the longitudinal member 4. Thus, the resistance to shock of the end structure of the vehicle is reinforced whilst being progressive and balanced so that it is opposed to buckling, an important cause of driving in for low absorption of energy.

At its end, the longitudinal member 4 may be provided with a stop 10, for example of elastomeric material, to absorb resiliently shocks of low intensity.

FIGS. 3 to 5 show an end structure of a vehicle 1a according to the invention, enabling the ensurance of better progressivity in the deformation to shocks of said structure. Identical parts or playing similar roles to the parts already described with reference to FIGS. 1 and 2 are denoted by the same reference numerals.

It will be observed that the longitudinal member 4 is constituted by a rectilinear profiled element, inclined downwardly when going towards the transverse unit 2.

The end 4a of the longitudinal member surrounds the auxiliary member 7 which is extended beyond the said end 4a by a part 7c. There will also be seen the stop 10 which is placed at the end of the part 7c. When the structure 1a of FIG. 3 undergoes a shock directed along the arrow F, the ensuing successive deformations are produced, as a function of the intensity of the shock.

Firstly, the stop 10 becomes elastically deformed along a path of amplitude K, the contour of the deformed stop 10 being represented in a mixed line in FIG. 3.

Then, the part 7c of the auxiliary member 7 undergoes permanent deformation, as shown in FIG. 4, and is folded by a length L.

Initiation of permanent deformation of the longitudinal member 4, as seen in FIG. 5, is then produced so that the part of the auxiliary member 7 comprised between the end 4a and the transverse unit 2 approaches the latter until the auxiliary member 7 becomes supported against the stop zone 8 as shown in FIG. 5. This is produced when the retraction M (FIG. 5) of the end 4a is equal to j.

If the intensity of the shock were such that, after these deformations, there still remains energy to be absorbed, the part of the auxiliary member 7 comprised between the end 4a and the transverse unit 2, and the longitudinal member 4 then undergo simultaneous permanent deformation and become folded.

Due to the invention, the longitudinal end structure of the vehicle, whilst being reinforced, enables progressive absorption of the energy of a longitudinal shock. This progressive absorption enables a reduction in the deceleration to which the persons accommodated in the cab are subjected. The safety of the vehicle, in case of collision, is hence improved.

I claim:

1. A longitudinal end structure for a vehicle, comprising:
   a transverse unit forming a wall of the body of said vehicle;
   a first longitudinal member fixed at one end to said transverse wall unit, the other end of said first longitudinal member extending from said transverse wall unit to an end of said vehicle;
   a second longitudinal member extending from said transverse wall unit to said other end of said first member, said first and second members forming an angle with each other;
   wherein one of said first and second members is inclined with respect to the longitudinal axis of said vehicle; and
   wherein one end portion of said second member is fixed to said other end portion of said first member and the other end portion of said second member is free and spaced from said transverse wall unit; and
   means for guiding said free end portion of said second member into engagement with a stop zone of said transverse wall unit only upon application of a force sufficient to deform at least one of said first and second members.

2. The end structure according to claim 1, further comprising an engine-drive assembly mounted transversely to the longitudinal axis of said vehicle and constituting a portion of said transverse wall unit, wherein said stop zone comprises a portion of high mechanical strength of said engine drive assembly.

3. The end structure according to claim 2, wherein said second member comprises a tubular element open at least at said free end portion and said guide means comprises a finger provided on said engine drive assembly substantially at the center of said stop zone.

4. The end structure according to claim 2, wherein said first longitudinal member is inclined with respect to the longitudinal axis of said vehicle, at least along one of its horizontal and vertical projections, said second member being rectilinear and substantially parallel to the longitudinal axis of said vehicle, said second member having an extension provided with a stop member of elastomeric material.

5. The end structure according to claim 2, wherein said first longitudinal member is inclined with respect to the longitudinal axis of said vehicle, at least along one of its horizontal and vertical projections, said second member being rectilinear and substantially parallel to the longitudinal axis of said vehicle, and wherein said one end portion of said second member extends beyond said other end portion of said first member, said other end portion of said first member surrounds and is fixed to said second member, and said first member comprises a rectilinear profile element inclined downwardly with respect to said longitudinal axis of said vehicle toward said transverse wall unit.

6. Structure according to claim 5, located at the front of the vehicle.

7. Structure according to claim 1, in which the general direction of the first longitudinal member is inclined to the longitudinal axis of the vehicle, at least along one of its horizontal and vertical projections, said second member being rectilinear and parallel to the longitudinal axis of the vehicle.

8. Structure according to claim 1, wherein the second member extends beyond the end of the first longitudinal member.

9. Structure according to claim 1, located at the front of the vehicle.

10. A longitudinal end structure for a vehicle, comprising:
- a transverse unit forming a wall of the body of said vehicle;
- a first longitudinal member fixed at one end to said transverse wall unit, the other end of said first longitudinal member extending from said transverse wall unit to an end of said vehicle;
- a second longitudinal member extending from said transverse wall unit to said other end of said first member, said first and second members forming an angle with each other;
- wherein one of said first and second elements is inclined with respect to the longitudinal axis of said vehicle; and
- wherein one end portion of said second member is fixed to said transverse wall unit and the other end portion of said second member is free and spaced from said other end portion of said first member; and
- means for guiding said free end portion of said second member and said other end portion of said first member into engagement at a stop zone of said first member only upon application of a force sufficient to deform at least one of said first and second members.

* * * * *